(12) United States Patent
Liu (10) Patent No.: US 11,949,950 B2
(45) Date of Patent: Apr. 2, 2024

(54) ELECTRONIC DEVICE AND CONTROL METHOD THEREFOR

(71) Applicant: BOE Technology Group Co., Ltd., Beijing (CN)

(72) Inventor: Zijun Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 68 days.

(21) Appl. No.: 17/778,516

(22) PCT Filed: Jun. 9, 2021

(86) PCT No.: PCT/CN2021/099110
§ 371 (c)(1),
(2) Date: May 20, 2022

(87) PCT Pub. No.: WO2021/259062
PCT Pub. Date: Dec. 30, 2021

(65) Prior Publication Data
US 2023/0039015 A1 Feb. 9, 2023

(30) Foreign Application Priority Data

Jun. 24, 2020 (CN) .......................... 202010588750.0

(51) Int. Cl.
*H04N 21/442* (2011.01)
*H04N 21/4223* (2011.01)
*H04N 21/472* (2011.01)

(52) U.S. Cl.
CPC ... *H04N 21/44218* (2013.01); *H04N 21/4223* (2013.01); *H04N 21/47202* (2013.01); *H04N 21/47217* (2013.01)

(58) Field of Classification Search
CPC ......... H04N 21/44218; H04N 21/4223; H04N 21/47202; H04N 21/47217;
(Continued)

(56) References Cited

U.S. PATENT DOCUMENTS 8,010,623 B1 * 8/2011 Fitch ..................... H04L 63/108
709/200
9,462,230 B1 * 10/2016 Agrawal ................ G06Q 50/20
(Continued)

FOREIGN PATENT DOCUMENTS

CN 103916711 A 7/2014
CN 104823176 A 8/2015
(Continued)

OTHER PUBLICATIONS

International Search Report & Written Opinion dated Aug. 30, 2021, regarding PCT/CN2021/099110.
(Continued)

*Primary Examiner* — Cynthia M Fogg
(74) *Attorney, Agent, or Firm* — Intellectual Valley Law, P.C.

(57) ABSTRACT

An electronic device and a control method therefor are provided. The electronic device includes controller, multimedia playing apparatus and input apparatus both connected to the controller, the controller includes processor and memory, wherein program instructions stored in the memory are executed by the processor to perform operations including: in response to target operation of user, obtaining input information of user; determining session information on session in which user participates according to the input information, the session information including at least target content in which user participates; determining target playing progress and target playing speed factor for the target content; controlling the multimedia playing apparatus to play the target content according to the target playing progress and the target playing speed factor, the target playing speed factor being greater than 1.

14 Claims, 2 Drawing Sheets

(58) Field of Classification Search
CPC ......... H04N 21/2387; H04N 21/41407; H04N 21/8549; H04N 21/8547; H04N 21/23418; H04N 21/6125; H04N 21/2187
USPC .......................................................... 725/14
See application file for complete search history.

(56) References Cited

U.S. PATENT DOCUMENTS

| | | | |
|---|---|---|---|
| 2003/0070182 A1* | 4/2003 | Pierre | H04N 21/4325 725/135 |
| 2013/0218363 A1* | 8/2013 | Nakamura | H02J 13/00004 700/297 |
| 2014/0059590 A1* | 2/2014 | Okubo | H04N 21/4622 725/32 |
| 2015/0128194 A1 | 5/2015 | Kuang et al. | |
| 2016/0127765 A1* | 5/2016 | Robinson | H04N 21/4542 725/12 |
| 2017/0160626 A1* | 6/2017 | Muramatsu | H04N 23/69 |
| 2017/0187982 A1 | 6/2017 | Pan | |
| 2018/0020243 A1* | 1/2018 | Ni | H04N 21/23418 |
| 2019/0246094 A1* | 8/2019 | Mate | G06F 3/011 |
| 2020/0032497 A1* | 1/2020 | Wu | A47K 10/32 |

FOREIGN PATENT DOCUMENTS

| | | | | |
|---|---|---|---|---|
| CN | 104902310 A | | 9/2015 | |
| CN | 107835458 A | | 3/2018 | |
| CN | 109275021 A | | 1/2019 | |
| CN | 109275034 A | * | 1/2019 | ....... H04N 21/44222 |
| CN | 109275034 A | | 1/2019 | |
| CN | 110035304 A | | 7/2019 | |
| CN | 110460905 A | | 11/2019 | |
| JP | 2012249764 A | | 12/2012 | |

OTHER PUBLICATIONS

First Office Action in the Chinese Patent Application No. 202010588750.0, dated Apr. 21, 2022; English translation attached.

* cited by examiner

ELECTRONIC DEVICE AND CONTROL METHOD THEREFOR

CROSS-REFERENCE TO RELATED APPLICATION

This application is a national stage application under 35 U.S.C. § 371 of International Application No. PCT/CN2021/099110, filed Jun. 9, 2021, which claims priority to Chinese Patent Application No. 202010588750.0, filed in China on Jun. 24, 2020. Each of the forgoing applications is herein incorporated by reference in its entirety for all purposes.

TECHNICAL FIELD

Embodiments of the present application relate to the technical field of multimedia playing, and in particular to, an electronic device and a control method thereof.

BACKGROUND

Watching a movie at the cinema is a common entertainment manner in daily life, and sometimes if a person need to go to the toilet or make a phone call, etc. when watching the movie at the cinema, he or she may miss some parts in the middle of the movie, causing more or less regret. The same occurs when participating in other activities such as listening to a concert, watching a basketball game, attending a conference, etc.

SUMMARY

Embodiments of the present application provide an electronic device and a method of controlling the electronic device, so as to address an issue that contents of a participated activity may be missed when a user needs to leave in the middle of watching a movie or participating in other activities.

In order to address this issue, the present application is implemented as follows.

In a first aspect, embodiments of the present application provides an electronic device, including a multimedia playing apparatus, an input apparatus and a controller, where the multimedia playing apparatus and the input apparatus are both connected to the controller, and the controller includes a processor and a memory, where program instructions stored in the memory are executed by the processor to perform operations including:

in response to a target operation of a user, controlling the input apparatus to obtain input information of the user;
determining, according to the input information, session information on a session in which the user participates, where the session information includes at least a target content in which the user participates;
determining a target playing progress and a target playing speed factor for the target content; and
controlling the multimedia playing apparatus to play the target content according to the target playing progress and the target playing speed factor, where the target playing speed factor is greater than 1.

Alternatively, the operation of determining the target playing progress of the target content includes: obtaining first indication information, and determining the target playing progress according to the first indication information.

Alternatively, the session information further includes an initial start time of the target content; and the first indication information includes departure time information of the user and the initial start time; and the operation of obtaining the first indication information, and determining the target playing progress according to the first indication information includes: obtaining the departure time information of the user and the initial start time, and determining the target playing progress according to the departure time information of the user and the initial start time.

Alternatively, the operation of obtaining the departure time information of the user includes: obtaining a first time instant when the user reaches the multimedia playing apparatus and a first time taken by the user from leaving a seat to reach a position where the multimedia playing apparatus is located; and determining the departure time information of the user according to the first time and the first time instant.

Alternatively, the operation of determining the target playing progress according to the departure time information of the user and the initial start time includes: determining, according to the departure time information of the user and the initial start time, a second time for which the user has watched the target content; and determining the target playing progress for the target content according to the initial start time and the second time.

Alternatively, the operation of determining the target playing speed for the target content includes: obtaining second indication information, and determining the target playing speed according to the second indication information.

Alternatively, the second indication information includes a total time length for the departure of the user and a staying time of the user; and the operation of obtaining the second indication information, and determining the target playing speed according to the second indication information includes: obtaining the total time length for the departure of the user and the staying time of the user, and determining the target playing speed according to the total time length for the departure of the user and the staying time of the user.

Alternatively, the operation of obtaining the total time length for the departure of the user includes: obtaining a first time taken by the user from leaving the seat to reach a position where the multimedia playing apparatus is located and the staying time of the user; and determining the total time length for the departure of the user according to the first time taken by the user from leaving the seat to reach the position where the multimedia playing apparatus is located and the staying time of the user.

Alternatively, the session information further includes a target site where the target content in which the user participates is located; and the operation of obtaining the first time taken by the user from leaving the seat to reach the position where the multimedia playing apparatus is located includes: obtaining first distance information on a distance between the target site and the multimedia playing apparatus; obtaining a walking speed of the user; and determining the first time according to the first distance information and the walking speed.

Alternatively, the operation of obtaining the first time taken by the user from leaving the seat to reach the position where the multimedia playing apparatus is located further includes: obtaining seat information of the user; determining, according to the seat information of the user, second distance information on a distance between the seat of the user and an exit of the target site; and determining the first time according to the first distance information, the second distance information, and the walking speed.

Alternatively, the input information is ticket information of the user or verification code information of the user.

Alternatively, the multimedia playing apparatus is a display; and the input apparatus is a scanner, a camera or a touch screen of the display or a key of the display.

Alternatively, the electronic device further includes:

a sensor connected to the processor, the sensor is configured to sense whether there is a person in front of the multimedia playing apparatus; and the operations further includes: controlling the multimedia playing apparatus to stop playing the target content in a case that the sensor senses that there is no person in front of the multimedia playing apparatus.

Alternatively, the session information further includes an initial start time of the target content and a finish time of the target content; and the operation further includes: determining, according to the initial start time of the target content and the finish time of the target content, whether a current time is within an ongoing time of the session in which the user participates; controlling the multimedia playing apparatus to play the target content in a case that the current time is within the ongoing time of the session in which the user participates, and controlling the multimedia playing apparatus not to play the target content in a case that the current time is not within the ongoing time of the session in which the user participates.

Alternatively, the multimedia playing apparatus is a display; the input apparatus includes a camera and a physical shielding apparatus for shielding the camera.

Alternatively, the physical shielding apparatus includes a rotatable lens cap disposed on the camera.

Alternatively, the multimedia playing apparatus is a display of a mobile phone; the input apparatus is a camera of the mobile phone.

In a second aspect, Embodiments of the present application provides a method of controlling an electronic device, including:

in response to a target operation of a user, controlling an input apparatus to obtain input information of the user;

determining, according to the input information, session information on a session in which the user participates, where the session information includes at least the target content the user participates in;

determining a target playing progress and a target playing speed factor for the target content; and playing the target content according to the target playing progress and the target playing speed factor, where the target playing speed factor is greater than 1.

Alternatively, the determining the target playing progress for the target content includes: obtaining first indication information, and determining the target playing progress according to the first indication information.

Alternatively, the session information further includes an initial start time of the target content; and the first indication information includes departure time information of the user and the initial start time; and the obtaining the first indication information, and determining the target playing progress according to the first indication information includes: obtaining the departure time information of the user and the initial start time, and determining the target playing progress according to the departure time information of the user and the initial start time.

Alternatively, the obtaining the departure time information of the user includes: obtaining a first time taken by the user from leaving a seat to reach a position where a multimedia playing apparatus is located and a first time instant when the user reaches the multimedia playing apparatus; and determining the departure time information of the user according to the first time and the first time instant.

Alternatively, the determining the target playing speed factor for the target content includes: obtaining second indication information, and determining the target playing speed according to the second indication information.

Alternatively, the second indication information includes a total time length for the departure of the user and a staying time of the user; and the obtaining the second indication information, and determining the target playing speed according to the second indication information includes: obtaining the total time length for the departure of the user and the staying time of the user, and determining the target playing speed according to the total time length for the departure of the user and the staying time of the user.

Alternatively, the obtaining the total time length for the departure of the user includes: determining, according to the first time taken by the user from leaving a seat to reach a position where the multimedia playing apparatus is located and the staying time of the user, the total time length for the departure of the user.

In a third aspect, Embodiments of the present application provides a control apparatus for the electronic device, including: an obtaining module, configured to control, in response to an target operation of a user, an input apparatus to obtain input information of the user; a first determination module, configured to determine session information on a session in which the user participates according to the input information, where the session information includes at least a target content in which the user participates; a second determination module, configured to determine a target playing progress and a target playing speed factor for the target content; a playing module, configured to play the target content according to the target playing progress and the target playing speed factor, where the target playing speed factor is greater than 1.

BRIEF DESCRIPTION OF THE DRAWINGS

Various additional advantages and benefits will become apparent to those skilled in the art upon reading the following detailed description of embodiments. The drawings are only for purposes of illustrating the exemplary embodiments and are not to be construed as limiting the application. Moreover, like reference numerals designate like parts throughout the drawings. In the drawings.

DETAILED DESCRIPTION

The technical solution in embodiments of the present application will be clearly described in conjunction with the drawings for the embodiments of the present application, and apparently, the described embodiments are some embodiments, rather than all embodiments of the present application. Based on the embodiments in the present application, all other embodiments obtained by a person of ordinary skill in the art without making any inventive effort fall within the protection scope of the present application.

The following embodiments explain the electronic device and the control method thereof provided by the present application by taking watching a movie at a cinema as an example. Apparently, the electronic device and the control method thereof provided by the present application are also applicable to participating in other activities such as listening to a concert, watching a basketball game, participating in a conference. It is noted that in these scenarios of watching other activities, at least one camera apparatus may be provided at the scene for recording the video on the scene. In the scenario of listening to the concert, at least one sound recording apparatus may be provided at the scene to obtain the recorded audio on the scene.

Figure 1:
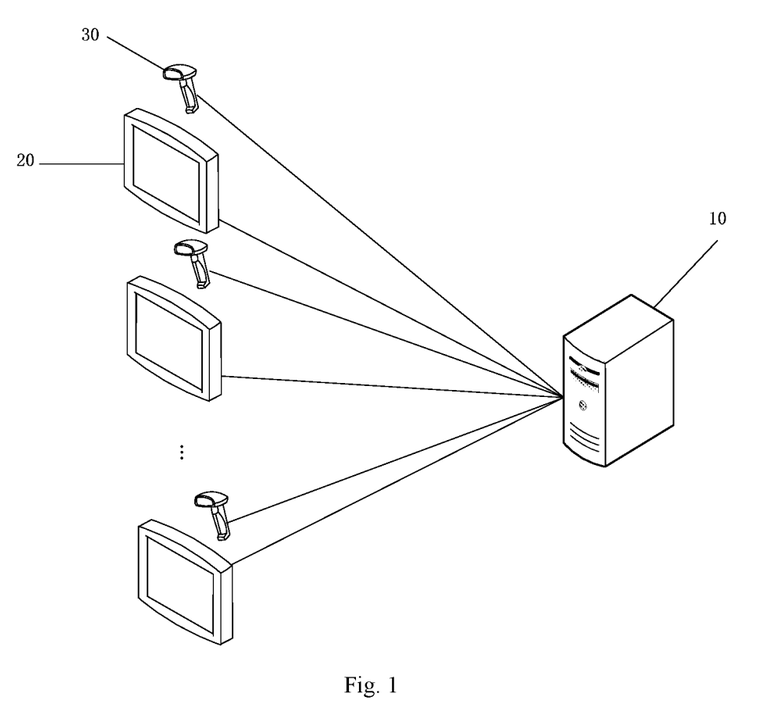
FIG. 1 is a schematic view of an electronic device according to embodiments of the present application.

Referring to FIG. 1, FIG. 1 is a schematic view of an electronic device according to embodiments of the present application. The electronic device includes a controller 10, a multimedia playing apparatus 20 and an input apparatus 30. The multimedia playing apparatus 20 and the input apparatus 30 are both connected to the controller 10.

In the figure for embodiments of the present application, the multimedia playing apparatus is a display capable of playing audio and video, and in some other embodiments of the present application, the multimedia playing apparatus may also be a sound apparatus for playing audio.

In the figure for embodiments of the present application, the quantity of multimedia playing apparatuses is plural and the quantity of input apparatuses is plural, and in some other embodiments of the present application, both the quantity of multimedia playing apparatuses and the quantity of input apparatuses are one.

In embodiments of the present application, the controller 10 includes a processor and a memory; the processor executes program instructions stored in the memory to perform the following operations: in response to a target operation of the user, controlling the input apparatus to obtain input information of the user; determining, according to the input information, session information on a session in which the user participates, where the session information includes at least a target content in which the user participates; determining a target playing progress and a target playing speed factor for the target content; controlling a multimedia playing apparatus to play the target content according to the target playing progress and target playing speed factor, where the target playing speed factor is greater than 1.

The target content may be a video or audio. In a case that the user participates in watching a movie, the target content is a movie video. In a case that the user is watching a drama, the target content may be a video of the drama in this case. In a case that the user is listening to a concert, the target content may be an audio of a track played in the concert.

The target playing progress refers to a determined starting time point of the target content for playing. For example, the target content is a 1.5-hour movie, and the starting time point may be a one-hour time instant in the movie, which indicates that the movie starts playing from the time instant of one hour.

A target playing speed refers to a determined playing speed for playing the target content. The playing speed factor is 1 when being played normally. In a case that the target playing speed factor is greater than 1, the playing speed at this case is greater than the playing speed at normal.

The multimedia playing apparatus is a multimedia playing apparatus corresponding to the input apparatus used by the user.

In an example of watching a movie at a cinema, a display (namely, the multimedia playing apparatus) and an input apparatus may be in a specific region outside a playing site (e.g. a position such as a toilet or a rest area outside the playing site). In a case that the user leaves the playing site temporarily for a certain reason while the movie is still playing, such as going to a toilet or making a call in the rest area, the user may go to the specific region and input, through the input apparatus 30 arranged at the specific region, the input information associated with the session information of the watched movie. The processor determines, according to the input information, the target playing progress and the target playing speed for the target movie currently watched by the user. The processor controls the multimedia playing apparatus 20 corresponding to the input apparatus 30 to play the target movie according to the target playing progress and the target playing speed factor. Since the target playing speed is greater than a normal playing speed, the contents missed by the user during the time when the user is absence at the playing site can be compensated, thereby improving user experiences.

In an example of watching a drama at a theater, a display (namely, the multimedia playing apparatus) and an input apparatus may be arranged in a specific region outside the theater (e.g. a position such as a toilet or a rest area outside the theater), while a camera apparatus may be arranged in the theater to record a live video of the drama. In a case that the user leaves the theater temporarily for a certain reason while the drama is still playing, such as going to a toilet or making a call in a rest area, the user may go to the specific region and input, through the input apparatus 30 arranged at the specific region, the input information associated with the session information of the drama watched by the user. The processor determines the target playing progress and the target playing speed of the target drama currently watched by the user according to the input information, and then controls the multimedia playing apparatus 20 corresponding to the input apparatus 30 to play the target drama recorded by the camera apparatus. Since the target playing speed is greater than the normal playing speed, the contents missed by the user during the time when the user is absence at the theater can be compensated, thereby improving user experiences.

In an example of listening to a concert in a concert hall, a sound apparatus (namely, a multimedia playing apparatus) and an input apparatus may be arranged in a specific region outside the concert hall (e.g. a position such as a toilet or a rest area outside the concert hall), while a sound recording apparatus may be arranged in the concert hall to record a live audio for the concert. In a case that the user leaves the concert hall temporarily for a certain reason during the concert, such as going to a toilet or making a call in a rest area, the user may go to the specific region and input, through the input apparatus 30 installed at the specific region, the input information associated with the session information of the concert in which the user participates. The processor determines the target playing progress and the target playing speed for the target concert in which the user participates according to the input information, and then controls the multimedia playing apparatus 20 corresponding to the input apparatus 30 to play a target audio recorded by the sound recording apparatus. Since the target playing speed is greater than the normal playing speed, the contents missed by the user during the time when the user is absence at the concert hall can be compensated, thereby improving user experiences.

In the above-mentioned embodiments, the multimedia playing apparatus is arranged at a position other than the target site where the target content in which the user participates is located, and in some other embodiments of the present application, the multimedia playing apparatus may also be a display screen in a mobile phone of the user.

In embodiments of the present application, alternatively, the input information is ticket information of the user or verification code information of the user. The ticket information may be one of the following: a bar code or a two-dimensional code on a paper ticket, a bar code or a two-dimensional code on an electronic ticket, an image for the paper ticket or the electronic ticket. The verification code is, for example, a verification code sent to a mobile phone of the user when the user purchases the ticket, or a verification code on the paper ticket or the electronic ticket.

In embodiments of the present application, alternatively, the input apparatus is at least one of a scanner, a camera, or an input apparatus of the display. The input apparatus of the display is, for example, a touch screen or a key of the display, etc.

In a case that the input apparatus is a scanner, the ticket information is the bar code or the two-dimensional code on the paper ticket or the electronic ticket scanned by the scanner. The processor may obtain the session information on the session in which the user participates from the bar code or the two-dimensional code scanned by the scanner.

In a case that the input apparatus is a camera, the ticket information is an image of the paper ticket or the electronic ticket captured by the camera. The processor may identify the image captured by the camera, and obtain the session information on the session in which the user participates. In the case that the input apparatus is the camera, if the camera is arranged in a place involving user privacy such as a toilet, the camera provided by the embodiments of the present application may include a physical shielding apparatus so as to protect user privacy. For example, a rotatable lens cap may be added to the camera, and the user may open the lens cap to scan paper tickets or electronic tickets only in a case that the camera needs to be used.

In a case that the input apparatus is a touch screen or a key of the display, etc., the ticket information is ticket information or verification code information inputted by the user through the touch screen or the key of the display, etc. The processor obtains the session information on the session in which the user participates according to the ticket information or the verification code information inputted by the user.

In the embodiments of the present application, in the case that the input apparatus 30 is the scanner or the camera, the target operation in the phrase "in response to the target operation of the user" may be that the user places the paper ticket or the electronic ticket into a scanning region of the input apparatus 30. In the case that the input apparatus 30 is the touch screen of the display or a keyboard, etc., the target operation in the phrase "in response to the target operation of the user" may be that the user inputs the ticket information or the verification code information into an input interface on the display.

In embodiments of the present application, the display may be a display screen, or other display device such as a projector. For example, in a case that the electronic device is applied to the cinema and the display is the display screen, the display screen may be installed on a door of a toilet or on a floor of the toilet. In a case that the display is a projector, an image may be projected onto an inner door of the toilet or onto the floor of the toilet by the projector. Alternatively, the display can be the display screen in a mobile phone of the user, and after a relevant application is installed on the mobile phone, the target content may be played on the mobile phone by scanning the ticket information through a camera on the mobile phone.

In embodiments of the present application, the session information further includes, in addition to the target content in which the user participates, at least one of the following: an initial start time and a finish time for the target content; a target site where the user is located; or seat information of the user. The initial start time refers to a time when the target content starts in the target site, and the finish time refers to a time when the target content finishes in the target site. For example the session information may include: "Star War", hall No. 2, row 10, seat 1, 10:00 am to 12:10 pm.

In embodiments of the present application, alternatively, the session information further includes: the initial start time and the finish time of the target content. The above mentioned operations further includes: determining, according to the initial start time and the finish time of the target content, whether a current time is within an ongoing time of the session in which the user participates; controlling the multimedia playing apparatus to play the target content in a case that the current time is within the ongoing time of the session in which the user participates, otherwise controlling the multimedia playing apparatus not to play the target content. Specifically, if the current time is within the ongoing time of the session in which the user participates, the target playing progress and the target playing speed factor for the target content may be determined firstly, and then the multimedia playing apparatus is controlled to play the target content according to the target playing progress and the target playing speed factor. If the current time is not within the ongoing time of the session in which the user participates, subsequent step(s) may be ended directly (for example, the subsequent step(s) may include a step of determining the target playing progress and the target playing speed factor for the target content), and the target content will not be played by the multimedia playing apparatus in this case.

That is to say, before playing the target content, the multimedia playing apparatus verifies whether the user has paid for the current session, i.e., the identity of the user is verified. The target content of the current session is played for the user only in a case that the user has paid for the current session.

Hereinafter, an illustration about how to determine the target playing progress for the target content will be given.

In embodiments of the present application, alternatively, the operation of determining the target playing progress of the target content includes: obtaining first indication information, and determining the target playing progress according to the first indication information.

In some embodiments of the present application, alternatively, the first indication information indicates a target playing progress for a target content to be played, and the first indication information may be directly inputted by the user through the input apparatus, or may include a target playing progress determined as follows: the user captures an image with a mobile phone when he/she is leaving, the image is sent to the processor, and the processor determines the target playing progress according to the image captured by the user. For example, the user may directly input, through the input apparatus, a time of the movie that the movie has been played (for example, one hour for which the movie has been played) when he/she is leaving, so that the processor can take one hour after the start of the movie as a starting point for the target playing progress. Alternatively, the user captures an image of the movie with the mobile phone when he/she is leaving, and then sends the image to the processor. The processor then determines the target playing progress by matching the captured image and the content of the movie.

In some embodiments of the present application, alternatively, the session information further includes a target site where the user is located; and the first indication information includes the target site where the user is located; and the operations of obtaining the first indication information, and determining the target playing progress according to the first indication information include: obtaining a first playing progress of the target content corresponding to the target site by synchronization; and taking the first playing progress as the target playing progress.

That is to say, the playing progress for the target content of the current session is synchronized directly, and the ongoing target content being played at the target site is synchronously played on the multimedia playing apparatus. This implementation can be realized easily, and is advantageous for saving implementation costs.

In still other embodiments of the present application, alternatively, the first indication information includes departure time information of the user; and the operations of obtaining the first indication information, and determining the target playing progress according to the first indication information include: obtaining the departure time information of the user, and determining the target playing progress according to the departure time information of the user.

That is to say, a playing progress of the target content which has been played at the departure time of the user when he/she leaves the target site is taken as the starting point of the target content to be played by the multimedia playing apparatus. In this manner, the user can watch the target content more completely.

In other embodiments of the present application, alternatively, the session information further includes an initial start time of the target content; the first indication information includes departure time information of the user and the initial start time; and the operations of obtaining the first indication information, and determining the target playing progress according to the first indication information include: obtaining the departure time information of the user and the initial start time, and determining the target playing progress according to the departure time information of the user and the initial start time.

For example, for a 90-minutes movie with an initial start time of 10:00 and the departure time of the user being 11:00, the target playing progress is a position from which the movie has been played for 1 hour. The movie is then played with this position as the starting point.

In the embodiments of the present application, the departure time information of the user may be determined as follows.

In some embodiments, alternatively, the operation of obtaining the departure time information of the user includes: obtaining a first time (namely, walking time) taken by the user from leaving a seat to reach a position where the multimedia playing apparatus is located, and obtaining a first time instant when the user reaches the multimedia playing apparatus; and determining departure time information of the user according to the first time and the first time instant. That is, the departure time is equal to the first time instant minus the first time. For example, the first time instant when the user reaches the multimedia playing apparatus is 12:00, the first time taken by the user from leaving the seat to reach the position where the multimedia playing apparatus is located is 10 minutes, then the departure time is 11:50.

In some embodiments, alternatively, the operation of obtaining the departure time information of the user includes: obtaining a departure time inputted by the user through the input apparatus.

In some embodiments, alternatively, the operation of obtaining the departure time information of the user includes: obtaining a departure time of the user from a mobile phone of the user. Specifically, the time when the user changes his/her point most recently may be detected by a sensor of the mobile phone as the departure time of the user, or the time when a pedometer starts counting steps most recently may be used as the departure time of the user. In this embodiment, the mobile phone of the user needs to be connected to the processor.

In embodiments of the present application, the first time taken by the user from leave the seat to reach the position where the multimedia playing apparatus is located may be determined as follows.

In some embodiments, alternatively, a pre-stored walking time for walking from the target site to the multimedia playing apparatus may be obtained as the first time.

In some embodiments, alternatively, first distance information indicating a distance between the target site and the multimedia playing apparatus is obtained. A walking speed of the user is obtained. The first time is determined according to the first distance information and the walking speed. In these embodiments, there is no limitation to the execution order for the operation of obtaining the first distance information and the operation of obtaining the walking speed. In practice, the operation of obtaining the first distance information may be performed first, or the operation of obtaining the walking speed may also be performed first. The first distance divided by the walking speed may be equal to the first time.

The walking speed of the user may be a preset walking speed, or the walking speed may be determined according to registration information about the user, and the registration information includes at least one of gender and age. For example, if the user is aged person, the determined walking speed may be slightly slower, and if the user is young person, the determined walking speed may be slightly faster. The walking speed can be determined more individually and accurately according to the registration information of the user.

In addition and alternatively, in order to determine the walking time of the user more accurately, the session information further includes seat information of the user; the operation of obtaining the first time taken by the user from leaving a seat to reach the position where the multimedia playing apparatus is located further includes: obtaining the seat information of the user; determining second distance information on a distance between a seat of the user to an exit of the target site according to the seat information of the user; and determining the first time according to the first distance information, the second distance information and the walking speed. Alternatively, the first time=(the distance indicated by the first distance information+the distance indicated by the second distance information)/the walking speed.

Generally, the walking time (first time) is slightly shorter if the seat of the user is close to the door of the target site, and slightly longer if the seat of the user is far from the doorway of the target site. In this embodiment, the distance between an actual position of the user to the target site can be calculated more accurately, so as to obtain a more accurate walking time.

Hereinafter, an illustration on how to determine the target playing speed for the target content will be given.

In embodiments of the present application, alternatively, the operation of determining the target playing speed for the target content includes: obtaining second indication information, and determining the target playing speed according to the second indication information.

In some embodiments of the present application, alternatively, the second indication information includes a total time length for the departure of the user and a staying time of the user; and the operations of obtaining the second indication information, and determining the target playing speed according to the second indication information include: obtaining the total time length for the departure of the user and the staying time of the user, and determining the target playing speed according to the total time length for the departure of the user and the staying time of the user.

In additional and alternatively, the operation of obtaining the total time length for the departure of the user includes: obtaining a first time taken by the user from leaving a seat to reach a position where the multimedia playing apparatus is located, and obtaining the staying time of the user; and determining the total time length for the departure of the user according to the staying time of the user and the first time taken by the user from leaving the seat to reach the position where the multimedia playing apparatus is located. The staying time of the user is inputted by the user through the input apparatus, or is preset. Alternatively, the target playing speed=(2*the walking time+the staying time of the user)/the staying time of the user.

In some embodiments of the present application, alternatively, the operations of obtaining the second indication information, and determining the target playing speed according to the second indication information includes: obtaining a first time taken by the user from a target site to a position where the multimedia playing apparatus is located, and determining the target playing speed factor according to the first time. Alternatively, the target playing speed may be determined to be larger in a case that the first time is longer.

In some embodiments of the present application, alternatively, the operations of obtaining the second indication information, and determining the target playing speed according to the second indication information include: obtaining a preset target playing speed factor. For example, the preset target playing speed factor is 2 times. In this way, the method of controlling the electronic device can be simplified.

In embodiments of the present application, the first time taken by the user from leaving the seat to reach the position where the multimedia playing apparatus is located may be determined as follows.

In some embodiments, alternatively, a pre-stored walking time for walking from the target site to the multimedia playing apparatus may be obtained as the first time.

In some embodiments, alternatively, first distance information on a distance between the target site and the multimedia playing apparatus is obtained; a walking speed of the user is obtained; and the first time is determined according to the first distance information and the walking speed. In this embodiment, there is no limitation to the execution order for the operation of obtaining the first distance information and the operation of obtaining the walking speed. The first distance divided by the walking speed equals the first time.

The walking speed of the user may be a preset walking speed, or the walking speed may be determined according to registration information about the user, and the registration information includes at least one of gender and age. For example, if the user is an aged person, the determined walking speed may be slightly slower, and if the user is a young person, the determined walking speed may be slightly faster. With the registration information of a user, the walking speed can be determined in a more individual and accurate way.

In addition and alternatively, in order to determine the walking time of the user more accurately, the session information further includes seat information of the user; the operation of obtaining the first time taken by the user from leave the seat to reach the position where the multimedia playing apparatus is located further includes: obtaining the seat information of the user; determining second distance information on a distance between the seat of the user and the exit of the target site according to the seat information of the user; and determining the first time according to the first distance information, the second distance information and the walking speed. Alternatively, the first time=(the distance in the first distance information+the distance in the second distance information)/the walking speed.

Generally, the walking time (first time) is slightly shorter if the seat of the user is close to the door of the target site, and is slightly longer if the seat of the user is far from the door of the target site. In the present embodiment, the distance between an actual position of the user and the playing site can be calculated more accurately, so as to obtain the walking time more accurately.

In embodiments of the present application, alternatively, the electronic device further includes a sensor connected to the processor, the sensor is configured to sense whether there is a person in front of the multimedia playing apparatus.

The above operations further includes: in a case that the sensor senses that there is no person in front of the multimedia playing apparatus, controlling the multimedia playing apparatus to stop playing the target content, thereby saving power.

In the above-mentioned embodiments, in a case that the user needs to go to a toilet or make a call while he/she is watching a movie or a game or participating in other activities and the like, an audio or a video for the movie, the game or the other activities and the like can be played for the user continuously by the multimedia playing apparatus arranged at the position such as the toilet or the rest area, and the audio or video can be played at a speed greater than the normal speed so as to compensate for the contents that should be missed by the user during the time when the user is absence, thereby improving user experiences.

Figure 2:
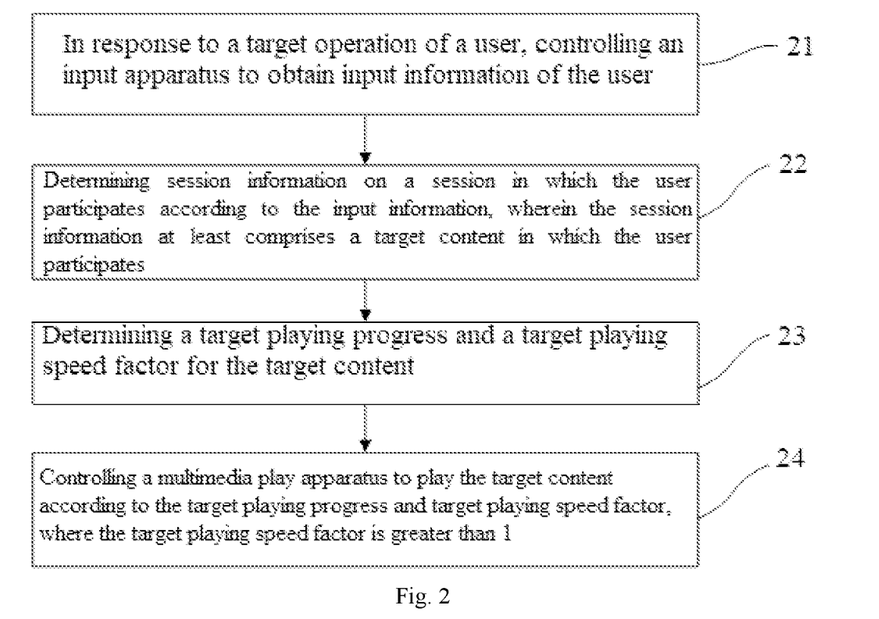
FIG. 2 is a flow chart of a method of controlling the electronic device according to embodiments of the present application.

Referring to FIG. 2, FIG. 2 is a flow chart of a method of controlling an electronic device according to embodiments of the present application. The method of controlling the electronic device includes the following steps.

Step 21: in response to a target operation of a user, controlling an input apparatus to obtain input information of the user.

Step 23: determining, according to the input information, session information on a session in which the user participates, where the session information includes at least a target content in which the user participates.

Step 23: determining a target playing progress and a target playing speed factor for the target content.

Step 24: controlling a multimedia playing apparatus to play the target content according to the target playing progress and target playing speed factor, where the target playing speed factor is greater than 1.

Alternatively, the step of determining the target playing progress for the target content includes: obtaining first indication information, and determining the target playing progress according to the first indication information.

Alternatively, the session information further includes an initial start time of the target content, and the first indication information includes departure time information of the user and the initial start time; and the step of obtaining the first indication information, and determining the target playing progress according to the first indication information includes: obtaining the departure time information of the user and the initial start time, and determining the target playing progress according to the departure time information of the user and the initial start time.

Alternatively, the step of obtaining the departure time information of the user includes: obtaining a first time taken by the user from leaving a seat to reach a position where the multimedia playing apparatus is located and obtaining a first time instant when the user reaches the multimedia playing apparatus; and determining the departure time information of the user according to the first time and the first time instant.

Alternatively, the step of determining the target playing progress according to the departure time information of the user and the initial start time includes: determining, according to the departure time information of the user and the initial start time, a second time for which the user has watched the target content; and determining the target playing progress for the target content according to the initial start time and the second time.

Alternatively, the step of determining the target playing speed for the target content includes: obtaining second indication information, and determining the target playing speed according to the second indication information.

Alternatively, the second indication information includes a total time length for the departure of the user and a staying time of the user; and the step of obtaining the second indication information, and determining the target playing speed according to the second indication information include: obtaining the total time length for the departure of the user and the staying time of the user, and determining the target playing speed according to the total time length for the departure of the user and the staying time of the user.

Alternatively, the step of obtaining the total time length for the departure of the user includes: obtaining a first time taken by the user from leaving a seat to reach a position where the multimedia playing apparatus is located and obtained a staying time of the user; and determining the total time length for the departure of the user according to the first time taken by the user from leaving the seat to reach the position where the multimedia playing apparatus is located and the staying time of the user.

Alternatively, the session information further includes a target site where the target content in which the user participates is located; and the step of obtaining the first time taken by the user from leaving the seat to reach the position where the multimedia playing apparatus is located includes: obtaining first distance information indicating a distance from the target site to the multimedia playing apparatus; obtaining a walking speed of the user; and determining the first time according to the first distance information and the walking speed.

Alternatively, the step of obtaining the first time taken by the user from leaving the seat to reach the position where the multimedia playing apparatus is located further includes: obtaining seat information of the user; determining, according to the seat information of the user, second distance information indicating a distance from a seat of the user to an exit of the target site; and determining the first time according to the first distance information, the second distance information and the walking speed.

Alternatively, the input information is ticket information or verification code information of the user.

Alternatively, the multimedia playing apparatus is a display; and the input apparatus is a scanner, a camera or a touch screen or a key of the display.

Alternatively, the electronic device further includes a sensor, configured to sense whether there is a person in front of the multimedia playing apparatus; the method further includes: in a case that the sensor senses that there is no person in front of the multimedia playing apparatus, controlling the multimedia playing apparatus to stop playing the target content.

Figure 3:
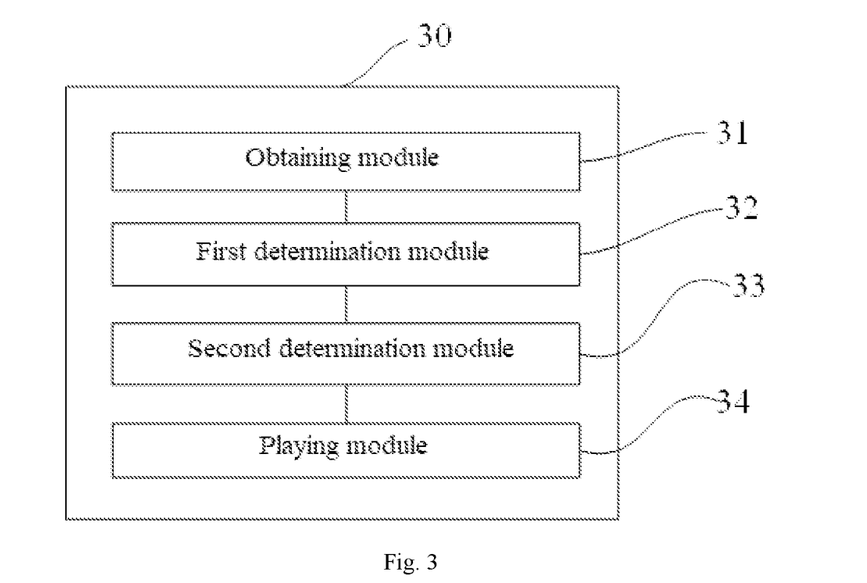
FIG. 3 is a schematic view of a control apparatus of an electronic device according to embodiments of the present application.

Referring to FIG. 3, FIG. 3 is a schematic view of a control apparatus of an electronic device according to embodiments of present application. The control apparatus of the electronic device includes:

an obtaining module 31, configured to controlling an input apparatus to obtain input information of a user in response to a target operation of the user;

a first determination module 32, configured to determine session information on a session in which the user participates according to the input information, where the session information includes at least a target content in which the user participates;

a second determination module 33, configured to determine a target playing progress and a target playing speed factor for the target content; and a playing module 34, configured to play the target content according to the target playing progress and the target playing speed factor, where the target playing speed factor is greater than 1.

Alternatively, the second determination module 33 is further configured to obtain first indication information, and to determine the target playing progress according to the first indication information.

Alternatively, the session information further includes an initial start time of the target content, and the first indication information includes departure time information of the user and the initial start time.

Alternatively, the second determination module 33 is further configured to obtain the departure time information of the user and the initial start time, and to determine the target playing progress according to the departure time information of the user and the initial start time.

Alternatively, the second determination module 33 is further configured to obtain departure time information of the user, to obtain a first time taken by the user from leaving a seat to reach a position where the multimedia playing apparatus is located and to obtain a first time instant when the user reaches the multimedia playing apparatus; and to determine the departure time information of the user according to the first time and the first time instant.

Alternatively, the second determination module 33 is further configured to obtain the second indication information, and to determine the target playing speed according to the second indication information.

Alternatively, the second indication information includes a total time length for the departure of the user and a staying time of the user.

Alternatively, the second determination module 33 is further configured to obtain the total time length for the departure of the user and the staying time of the user, and to determine the target playing speed according to the total time length for the departure of the user and the staying time of the user.

Alternatively, the second determination module 33 is further configured to determine the total time length for the departure of the user according to a first time taken by the user from leaving a seat to reach a position where the multimedia playing apparatus is located and the staying time of the user.

Embodiments of the present application also provide a readable storage medium, where a program or an instruction is stored on the readable storage medium, and the program or instruction, when being executed by the processor, implements various processes in the above-mentioned embodiments for the method of controlling the electronic device. The same technical effect can be achieved, and the description thereof is omitted herein to avoid repetition.

The processor is the processor in the electronic device described in the above-mentioned embodiments. The readable storage medium includes a computer readable storage medium such as a computer read-only memory (Read-Only Memory, ROM), a random-access memory (Random Access Memory, RAM), a magnetic disk or an optical disk, etc.

It should be noted that, as used herein, the terms "include", "comprise", or any other variation thereof, are intended to be a non-exclusive inclusion, such that a process, a method, an article of manufacture, or an apparatus that includes a series of elements does not include those elements only, but may include other element(s) not expressly listed or inherent to such process, method, article of manufacture, or apparatus. An element defined by a phrase "includes a" does not preclude additional identical element(s) to be included in the process, method, article, or apparatus that includes the element. Furthermore, it is noted that the scope of the method and apparatus according to embodiments of the present application are not limited to that the functionalities are performed in the order shown or discussed to achieve related, and may include the functionalities are performed in a substantially simultaneous manner or in a reverse order depending on the functionality involved. For example, the described method may be performed in an order different than the described order, and in the method, various steps may be added, omitted, or combined. In addition, features described with reference to a certain example may be combined in other examples.

From the above description of the embodiments, it is clear to a person skilled in the art that the method embodiment may be implemented by means of software in conjunction with a general purpose hardware platform, and may also be implemented by means of hardware only, but in many cases the former is preferred. Based on this understanding, the technical solution of the present application can be embodied in a software product which is stored in a storage medium (such as a ROM/RAM, a magnetic disk, an optical disk) and includes instructions to enable a terminal (which can be a mobile phone, a computer, a server, an air conditioner, or a network equipment, etc.) to perform the method described in various embodiments of the present application.

The embodiments of the present application are described above with reference to the accompanying drawings. The present application is not limited to the above-mentioned specific embodiments, and the above-mentioned specific embodiments are illustrative rather than limiting. Various modifications may be made by a person of ordinary skill in the art given the hint of the present application without departing from the spirit of the present application and the scope as claimed in the claims, which should fall within the protection scope of the present application.

What is claimed is:

1. An electronic device, comprising: a multimedia playing apparatus, an input apparatus and a controller;
   wherein the multimedia playing apparatus and the input apparatus are both connected to the controller, and the controller comprises a processor and a memory, wherein program instructions stored in the memory are executed by the processor to perform the following operations:
   in response to a target operation of a user, controlling the input apparatus to obtain input information of the user;
   determining, according to the input information, session information on a session in which the user participates, the session information comprising at least a target content in which the user participates;
   determining a target playing progress and a target playing speed factor for the target content; and
   controlling the multimedia playing apparatus to play the target content according to the target playing progress and the target playing speed factor, wherein the target playing speed factor is greater than 1;
   wherein the determining the target playing progress for the target content comprises:
   obtaining first indication information, and determining the target playing progress according to the first indication information;
   wherein the session information further comprises an initial start time of the target content; and the first indication information comprises departure time information of the user and the initial start time; and
   the obtaining the first indication information, and determining the target playing progress according to the first indication information comprises: obtaining the departure time information of the user and the initial start time, and determining the target playing progress according to the departure time information of the user and the initial start time;
   wherein the obtaining the departure time information of the user comprises:
   obtaining a first time instant when the user reaches the multimedia playing apparatus and a first time taken by the user from leaving a seat to reach a position where the multimedia playing apparatus is located; and determining the departure time information of the user according to the first time and the first time instant.

2. The electronic device according to claim 1, wherein the determining the target playing progress according to the departure time information of the user and the initial start time comprises:
   determining, according to the departure time information of the user and the initial start time, a second time for which the user has watched the target content; and determining the target playing progress for the target content according to the initial start time and the second time.

3. The electronic device according to claim 1, wherein the determining the target playing speed factor for the target content comprises:
obtaining second indication information, and determining the target playing speed factor according to the second indication information;
wherein the second indication information comprises a total time length for the departure of the user and a staying time of the user; and
the obtaining the second indication information, and determining the target playing speed factor according to the second indication information comprises: obtaining the total time length for the departure of the user and the staying time of the user, and determining the target playing speed factor according to the total time length for the departure of the user and the staying time of the user.

4. The electronic device according to claim 3, wherein the obtaining the total time length for the departure of the user comprises:
obtaining a first time taken by the user from leaving a seat to reach a position where the multimedia playing apparatus is located and the staying time of the user; and determining the total time length for the departure of the user according to the first time taken by the user from leaving the seat to reach the position where the multimedia playing apparatus is located and the staying time of the user.

5. The electronic device according to claim 1, wherein the session information further comprises a target site where the target content in which the user participates is located; and
the obtaining the first time taken by the user from leaving a seat to reach the position where the multimedia playing apparatus is located comprises: obtaining first distance information on a distance between the target site and the multimedia playing apparatus; obtaining a walking speed of the user; and determining the first time according to the first distance information and the walking speed.

6. The electronic device according to claim 5, wherein the obtaining the first time taken by the user from leaving the seat to reach the position where the multimedia playing apparatus is located further comprises:
obtaining seat information of the user; determining, according to the seat information of the user, second distance information on a distance between the seat of the user and an exit of the target site; and determining the first time according to the first distance information, the second distance information, and the walking speed.

7. The electronic device according to claim 1, wherein the input information is ticket information of the user or verification code information of the user; and
the multimedia playing apparatus is a display, and the input apparatus is a scanner, a camera or a touch screen of the display or a key of the display;
or
the multimedia playing apparatus is a display, and the input apparatus comprises a camera and a physical shielding apparatus for shielding the camera;
or
the multimedia playing apparatus is a display of a mobile phone, and the input apparatus is a camera of the mobile phone.

8. The electronic device according to claim 7, wherein the physical shielding apparatus comprises a rotatable lens cap disposed on the camera.

9. The electronic device according to claim 1, further comprising:
a sensor connected to the processor, the sensor being configured to sense whether there is a person in front of the multimedia playing apparatus; and
the program instructions stored in the memory being executed by the processor to further perform the following operations: controlling the multimedia playing apparatus to stop playing the target content in a case that the sensor senses that there is no person in front of the multimedia playing apparatus.

10. The electronic device according to claim 1, wherein the session information further comprises an initial start time of the target content and a finish time of the target content; and
the program instructions stored in the memory are executed by the processor to further perform the following operations: determining, according to the initial start time of the target content and the finish time of the target content, whether a current time is within an ongoing time of the session in which the user participates; controlling the multimedia playing apparatus to play the target content in a case that the current time is within the ongoing time of the session in which the user participates, and controlling the multimedia playing apparatus not to play the target content in a case that the current time is not within the ongoing time of the session in which the user participates.

11. A method of controlling an electronic device, comprising:
in response to a target operation of a user, controlling an input apparatus to obtain input information of the user;
determining, according to the input information, session information on a session in which the user participates, wherein the session information comprises at least a target content in which the user participates;
determining a target playing progress and a target playing speed factor for the target content; and
controlling a multimedia playing apparatus to play the target content according to the target playing progress and the target playing speed factor, wherein the target playing speed factor is greater than 1;
wherein the determining the target playing progress for the target content comprises:
obtaining first indication information, and determining the target playing progress according to the first indication information;
wherein the session information further comprises an initial start time of the target content; and the first indication information comprises departure time information of the user and the initial start time; and
the obtaining the first indication information, and determining the target playing progress according to the first indication information comprises: obtaining the departure time information of the user and the initial start time, and determining the target playing progress according to the departure time information of the user and the initial start time;
wherein the obtaining the departure time information of the user comprises:
obtaining a first time taken by the user from leaving a seat to reach a position where the multimedia playing apparatus is located and a first time instant when the user reaches the multimedia playing apparatus; and determining the departure time information of the user according to the first time and the first time instant.

12. The method according to claim 11, wherein the determining the target playing speed factor of the target content comprises:
    obtaining second indication information, and determining the target playing speed factor according to the second indication information.

13. The method according to claim 12, wherein the second indication information comprises a total time length for departure of the user and a staying time of the user;
    the obtaining the second indication information, and determining the target playing speed factor according to the second indication information comprise: obtaining the total time length for the departure of the user and the staying time of the user, and determining the target playing speed factor according to the total time length for the departure of the user and the staying time of the user.

14. The method according to claim 13, wherein the obtaining the total time length for the departure of the user comprises:
    determining, according to a first time taken by the user from leaving a seat to reach a position where the multimedia playing apparatus is located and the staying time of the user, the total time length for the departure of the user.

* * * * *